(12) United States Patent
Moehnke et al.

(10) Patent No.: US 7,155,895 B2
(45) Date of Patent: Jan. 2, 2007

(54) COUPLING LINK

(75) Inventors: Michael D. Moehnke, Springdale, WA (US); Stephen P. Doan, Oregon City, OR (US); Anthony Miotke, Sublimity, OR (US)

(73) Assignee: Columbia Steel Casting Co., Inc., Portland, OR (US)

( * ) Notice: Subject to any disclaimer, the term of this patent is extended or adjusted under 35 U.S.C. 154(b) by 0 days.

(21) Appl. No.: 11/295,207

(22) Filed: Dec. 5, 2005

(65) Prior Publication Data

US 2006/0137322 A1    Jun. 29, 2006

Related U.S. Application Data

(60) Provisional application No. 60/639,674, filed on Dec. 27, 2004.

(51) Int. Cl.
*F16G 15/02* (2006.01)
*F16G 15/14* (2006.01)

(52) U.S. Cl. .............................................. 59/84; 59/85
(58) Field of Classification Search .................... 59/78, 59/80, 84, 85
See application file for complete search history.

(56) References Cited

U.S. PATENT DOCUMENTS

| | | | |
|---|---|---|---|
| 271,141 A | 1/1883 | Simons et al. | |
| 523,441 A | 7/1894 | Rae | |
| 761,812 A | 6/1904 | Austin | |
| 819,007 A * | 4/1906 | Dresler | 59/85 |
| 851,619 A | 4/1907 | Dresler | |
| 859,082 A | 7/1907 | Kenter | |
| 1,065,564 A | 6/1913 | Tobin | |
| 1,386,732 A | 8/1921 | Reid et al. | |
| 1,513,729 A | 11/1924 | Adams | |
| 1,672,867 A | 6/1928 | Bazeley et al. | |
| 1,682,983 A | 9/1928 | Pryor | |
| 1,776,515 A | 9/1930 | Leahy et al. | |
| 1,787,926 A * | 1/1931 | Allen | 59/85 |
| RE21,093 E * | 5/1939 | Barnes | 59/84 |
| 2,175,504 A | 10/1939 | Ehmann | |
| 2,216,831 A | 10/1940 | Robbins | |
| 2,226,755 A | 12/1940 | Ehmann | |
| 2,353,939 A | 7/1944 | Staats | |
| 2,357,768 A | 9/1944 | Robbins | |
| 2,369,344 A | 2/1945 | Ehmann | |
| 2,382,344 A * | 8/1945 | St Pierre | 59/85 |
| 2,385,232 A | 9/1945 | Robbins | |
| 2,398,897 A | 4/1946 | St. Pierre | |
| 2,537,405 A * | 1/1951 | Gilbert | 59/85 |
| 2,621,470 A | 12/1952 | Robbins | |
| 2,700,274 A | 1/1955 | Waller | |
| 2,761,275 A | 9/1956 | Robbins | |
| 2,777,284 A | 1/1957 | Page | |
| 2,819,586 A | 1/1958 | St. Pierre | |
| 3,134,221 A | 5/1964 | Bergman | |
| 3,241,309 A | 3/1966 | Mason | |
| 3,243,952 A * | 4/1966 | Page | 59/85 |

(Continued)

*Primary Examiner*—David B. Jones
(74) *Attorney, Agent, or Firm*—Klarquist Sparkman, LLP

(57) ABSTRACT

A coupling link for connecting chain includes a generally C-shaped link member, a lock member, and a securing member. The C-shaped link member defines an interior opening and has first and second opposing ends that are spaced from each other by a gap. The lock member is shaped to couple the first and second ends together. The securing member is operable to secure the lock member to the link member and to urge the first and second ends of the link member closer together.

21 Claims, 3 Drawing Sheets

U.S. PATENT DOCUMENTS

| | | | |
|---|---|---|---|
| 3,246,464 A * | 4/1966 | Schommer | 59/85 |
| 3,403,506 A | 10/1968 | Robbins | |
| 3,453,822 A | 7/1969 | Crook, Jr. | |
| 3,732,688 A | 5/1973 | Horvath | |
| 3,899,873 A | 8/1975 | Fink | |
| 3,994,127 A | 11/1976 | Gower | |
| 5,133,179 A | 7/1992 | Bernt et al. | |
| 5,345,754 A | 9/1994 | Deramaux et al. | |
| 5,469,697 A | 11/1995 | Kuroki | |
| 5,966,924 A | 10/1999 | Schulte-Feldmann | |
| 5,974,779 A | 11/1999 | Orscheln et al. | |
| 6,021,634 A | 2/2000 | Brodziak | |
| 6,176,073 B1 | 1/2001 | Shine | |
| 6,220,011 B1 | 4/2001 | Dalferth et al. | |
| 6,223,517 B1 | 5/2001 | Bogdan et al. | |
| 6,256,974 B1 | 7/2001 | Shanks, Sr. | |

* cited by examiner

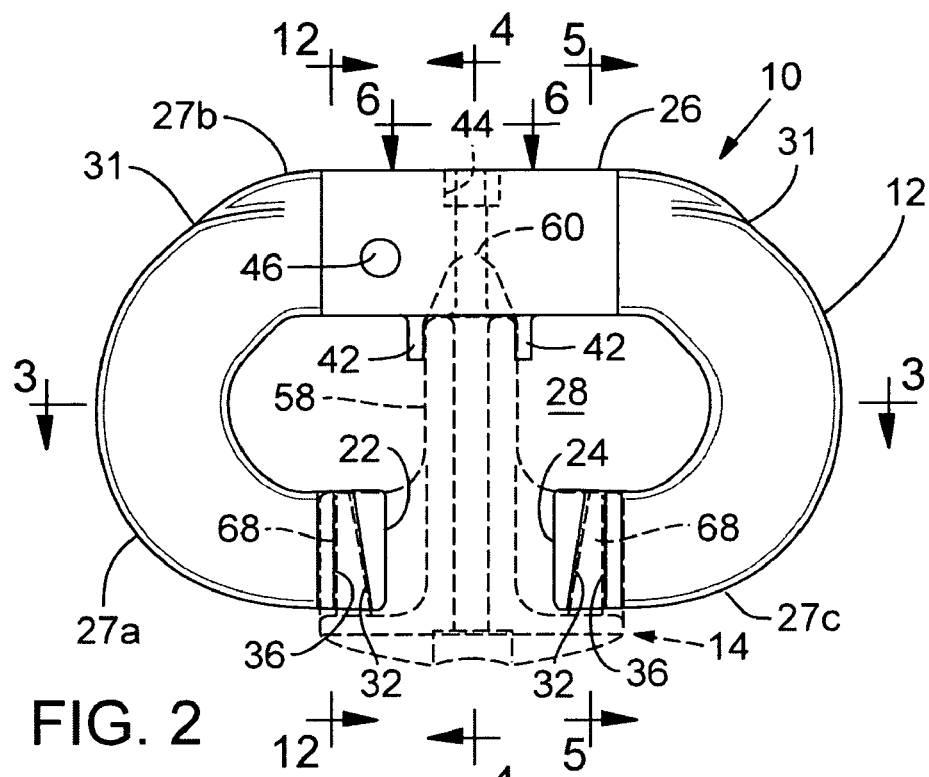
FIG. 2
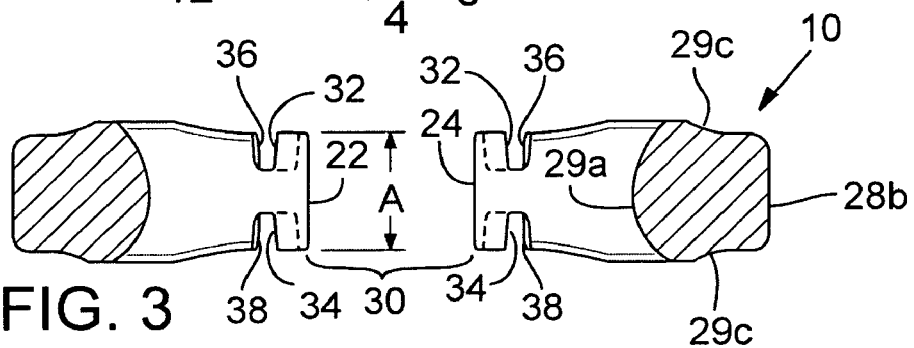
FIG. 3
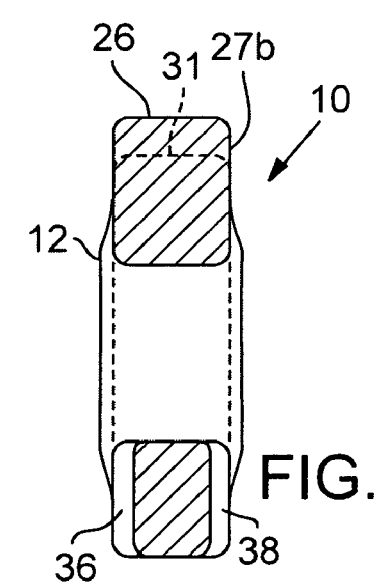
FIG. 4
FIG. 5
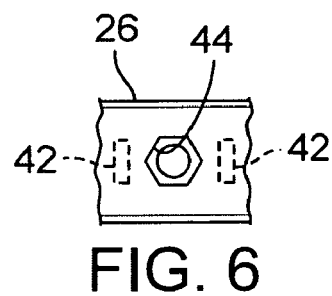
FIG. 6

COUPLING LINK

CROSS REFERENCE TO RELATED APPLICATION

This application claims the benefit of U.S. Provisional Patent Application No. 60/639,674, filed Dec. 27, 2004, which is hereby incorporated by reference.

FIELD

This application relates to chain links, and particularly to a coupling link used to couple a portion of chain to another portion of chain or other object.

BACKGROUND

Coupling links are known. A coupling link may be used to replace a broken link of chain, and thus it generally has a adaptable configuration allowing at least one portion to be passed through a conventional chain link or links having a closed periphery, and then to be secured. In addition to coupling portions of chain together, coupling links are sometimes used to couple one end of a chain to another object, e.g., an eyelet.

For high load applications, current coupling links fall short of providing a secure, easy-to-use and robust solution for repairing a broken chain in the field.

SUMMARY

Disclosed below are representative embodiments that are not intended to be limiting in any way. Instead, the present disclosure is directed to novel and non-obvious features, aspects and equivalents of the embodiments of the coupling link described below. The disclosed features and aspects of the embodiments can be used alone or in various novel and non-obvious combinations and sub-combinations with one another.

According to some embodiments, a coupling link for connecting chain includes a generally C-shaped link member, a lock member and a securing member. The link member defines an interior opening and has first and second opposing ends that are spaced apart from each other by a gap. The lock member is shaped to couple the first and second ends together to close the gap. The securing member is operable to secure the lock member to the link member, and to move the lock member to urge the first and second ends of the link member closer together. In the described embodiments, the securing member can have a portion extending in a direction generally transverse to the link member.

According to some embodiments, the first and second ends of the link member can have respective angled surfaces that slant away from each other in a direction from an outer periphery of the link member towards the interior opening. These may be first angled surfaces, and there may be corresponding second angled surfaces positioned on an opposite side of the link member. The first and second ends of the link member can have respective guide surfaces spaced from the respective angled surfaces. The lock member can have angled surfaces positioned to engage the angled surfaces of the ends of the link member.

According to some embodiments, the link member has a first curved portion extending from the first end, a second curved portion extending from the second end and an intermediate portion extending between the first curved portion and the second curved portion. The intermediate portion can have a cross-section of greater area than the cross-sections of the first end and the second end. The intermediate portion can have a cross-section of greater area than the cross-sections of the first and second curved portions. The intermediate portion can have a cross-section of greater area than a corresponding cross-section of a conventional regular link member of similar size. The outer periphery of the link member can be asymmetrically shaped about a longitudinal axis of the link.

According to some embodiments, the link member has an aperture dimensioned to receive an end of the transverse locking member. The aperture can be a through hole, and the coupling link can include a fastener engageable with the end of the transverse locking member when positioned to project though the through hole. The intermediate portion can have a pair of ribs positioned on opposite sides of the aperture.

In some embodiments, when the lock member is fully coupled to the link member, the link member has a predetermined compression loading force exerted by the lock member. When the lock member is fully coupled to the link member, the gap between the ends of the link member decreases.

The lock member is generally T-shaped and has a portion configured to extend generally transversed to the link member when the lock member is coupled to the link member. The lock member has an aperture dimensioned to receive the securing member. The securing member can be a bolt. The coupling link can include a nut positionable to engage an end of the bolt adjacent an outer surface of the link member. The transverse portion of the lock member can have a pair of spaced-apart tabs dimensioned to straddle the link member when the lock member and the link member are fully coupled together.

The foregoing and additional features and advantages of the disclosed embodiments will become more apparent from the following detailed description which proceeds with reference to the following drawings.

BRIEF DESCRIPTION OF THE DRAWINGS

FIG. 2 is a top plan view of the link member of FIG. 1 with a lock member in dashed lines shown in an assembled position.

FIG. 3 is a cross-sectional view of the link member taken along the line 3—3 in FIG. 2.

FIG. 4 is a cross-sectional view of the link member taken along the line 4—4 in FIG. 2.

FIG. 5 is a cross-sectional view of the link member taken along the line 5—5 in FIG. 2.

FIG. 6 is a view of the rear side of the link member in elevation taken at the line 6—6 in FIG. 2.

FIG. 12 is a cross-sectional view showing the link member with the lock member in its secured position.

FIG. 13 is a perspective view showing the coupling link assembly in an assembled state.

DETAILED DESCRIPTION

Disclosed below are representative embodiments that are not intended to be limiting in any way. Instead, the present disclosure is directed toward novel and nonobvious features, aspects and equivalents of the embodiments of the coupling link described below. The disclosed features and aspects of the embodiments can be used alone or in various novel and nonobvious combinations and sub-combinations with one another.

Figure 1:
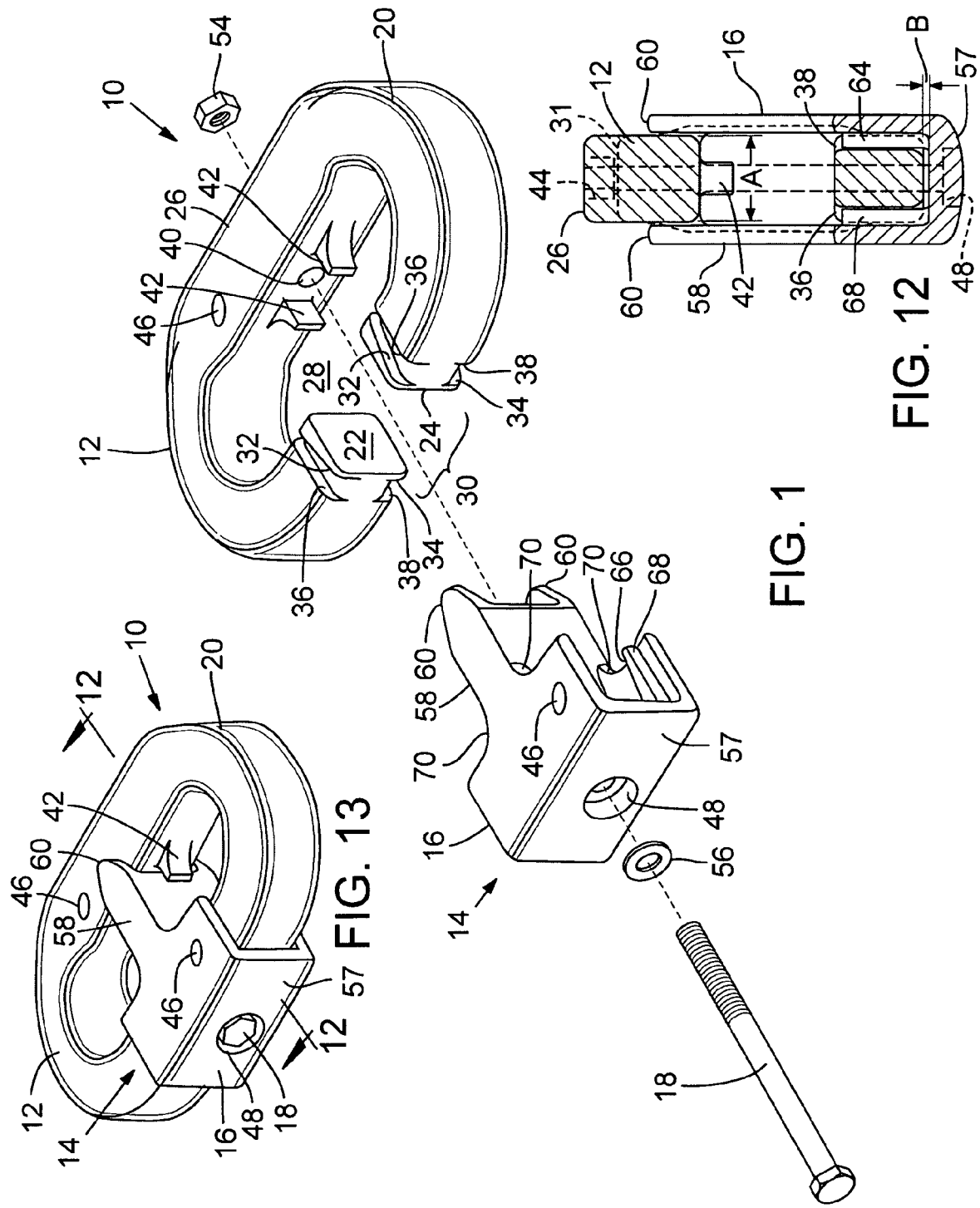
FIG. 1 is a exploded view of an embodiment of the coupling link assembly, which shows a locking assembly separated from a link member.
Figure 9:
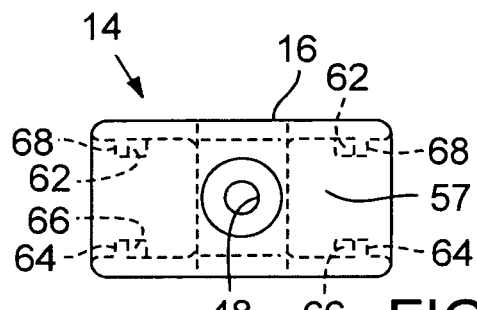
FIG. 9 is a front plan view of the lock member of FIG. 1.

Referring to FIG. 1, one representative embodiment of a coupling link assembly 10 is shown in an exploded state, illustrating the relationship between a link member 12 and a locking assembly 14 adapted to mate with the link member 12. As shown, the locking assembly 14 includes a lock member 16 and a securing member 18 adapted to removably secure the lock member 16 to the link member 12, thus forming a completed link as shown in FIG. 13.

In some embodiments, the locking assembly is configured to draw the ends of the link from their positions at rest to a coupled position in which they are closer together. The same principles described herein would apply to links of other shapes, such as links with a continuously curving periphery or links with more than two straight portions. In these embodiments, the lock member compresses the link member together, thus creating a predetermined initial pre-stress in the coupling link when it is fully assembled. Such a fit between the lock member and the link member helps reduce the failures observed in other coupling links due to effects of cyclical loading and unloading with play between the link member and the lock member.

Referring to FIGS. 1–6, the link member 12 has a generally C-shaped body 20 with a first end 22, a connecting portion 26 extending from the first end 22 and terminating in a second end 24. The second end 24 is positioned opposite and separated by a gap 30 from the first end 22. Within the generally C-shaped body 20, an opening 28 is defined. Referring to FIG. 2, the connecting portion 26 has a first curved portion 27a joined to a generally straight intermediate portion 27b, which in turn is joined to a second curved portion 27c.

In some embodiments, the link member 12 and the lock member 16 having mating features that engage each other when the lock member 16 is secured to the link member 12. For example, as best shown in FIGS. 1–3, the ends 22, 24 of the link member 12 may have respective angled surfaces 32 on one side of the link. As best shown in FIG. 2, the angled surfaces 32 are closer at their outer ends and spaced farther apart at their inner ends adjacent the opening 28. In some embodiments, these angled surfaces 32 are first angled surfaces and there are also second angled surfaces 34 on a side of the link member 12 opposite the angled surfaces 32, as best shown in FIGS. 1 and 3.

The mating features may also include guide surfaces, such as the straight guide surfaces 36. There may also be second guide surfaces 38, as best shown in FIGS. 1 and 3.

In some embodiments, the securing member 18 is a bolt or other type of threaded fastener adapted to couple the lock member 16 to the link member 12, and the link member 12 has an aperture 40 for receiving one end of the securing member 18. Referring to FIGS. 1 and 2, the aperture 40 in the illustrated embodiment extends through the connecting portion 26 and is positioned approximately midway between the ends 22, 24. In the illustrated embodiment, there is a pair of tabs 42, with one tab extending from each side of the aperture 40. The link member 12 may of course include indicia, such as, e.g., at a location 46 as shown in FIG. 2.

In the illustrated embodiment, the securing member 18 is a bolt with a hex head 52, the aperture 40 extends through the link member 12, and a nut 54 is attached at the protruding end of the securing member 18. In this embodiment, the aperture 40 may be a simple bore, or it may include a recess or counterbore 44 as best shown in FIG. 2. In some embodiments, the counterbore or recess 44 is sized to at least partially accommodate the nut 54, which serves to provide some protection to the nut 54 during use of the link assembly 10. For some applications, it is also possible to provide for a threaded connection between the securing member 18 and the aperture 40, in which case the aperture 40 would not need to extend through the link member 12 and the nut 54 would not be required.

Referring to FIG. 2, the first and second curved portions 27a, 27c of the connecting portion 26 smoothly increase in cross-sectional area in the direction from the respective first and second ends 22, 24 (see FIG. 4) to approximately the center axis of the link member 12, and then decrease in cross-sectional area in the direction toward their respective junctions with the intermediate portion 27b. As best shown in FIG. 3, the curved portions 27a, 27c have a "bread slice"-shaped cross-section away from the first and seconds ends 22, 24, with curved inner surfaces 29a, generally straight outer surfaces 29b and side surfaces 29c of changing curvature. Thus, the curved portions 27a, 27c have a greater dimension or thickness adjacent the opening 28, and this dimension decreases in a radially outward direction.

Referring to FIGS. 2, 4 and 5, the intermediate portion 27b of the connecting portion 26 has a larger cross-sectional area than the first and second curved portions 27a, 27c or the ends 22, 24. In the illustrated embodiment, as best shown in FIG. 4, the cross section of the intermediate portion 27b is generally rectangular. Referring to FIG. 12, the cross-section of a conventional link of similar size is shown superimposed in dashed lines at 31 to illustrate the larger cross-section of the intermediate portion 27b. As shown in FIG. 2, the larger cross-section of the intermediate portion 27b results in the link member 12 having an asymmetrical shape. Stated differently, the link member 12 has one side that protrudes beyond the regular profile of a similarly-sized conventional link.

Figure 7:
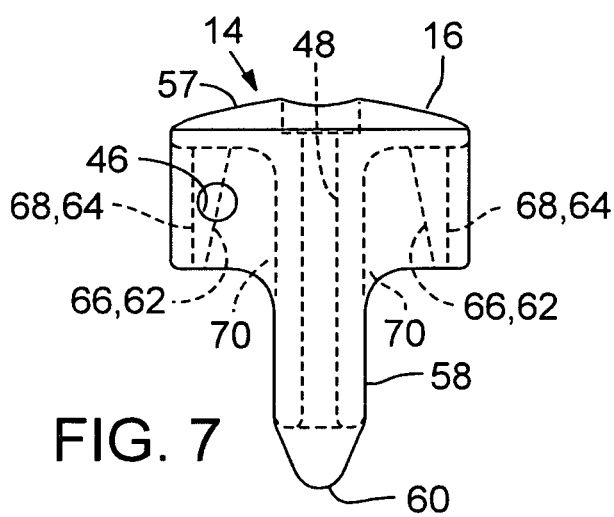
FIG. 7 is a top plan view of the lock member of FIG. 1.
Figure 8:
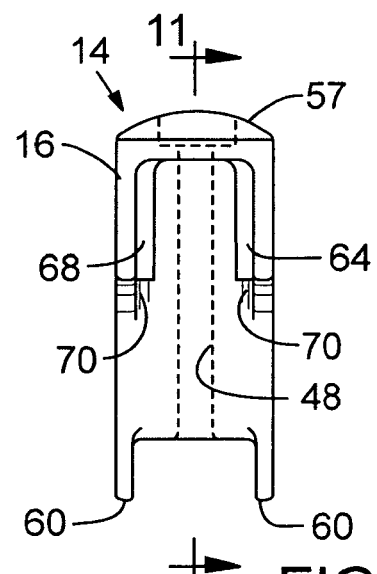
FIG. 8 is a right side elevation view of the lock member of FIG. 1.
Figure 10:
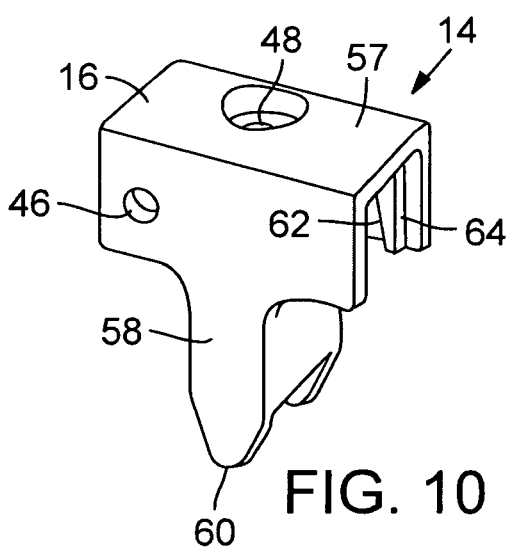
FIG. 10 is a perspective view of the lock member of FIG. 1.
Figure 11:
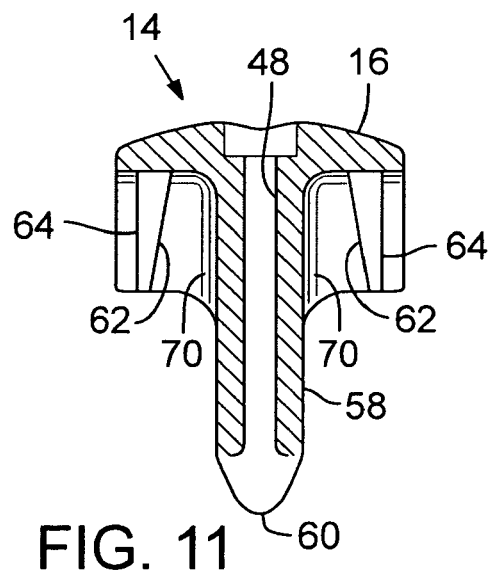
FIG. 11 is a cross-sectional view of the lock member taken along the line 11—11 in FIG. 8.

Additional views of the illustrated embodiment of the lock member 16 are shown in FIGS. 7–12. Referring to FIG. 7, the lock member 16 has a generally T-shaped configuration with an inner nose portion 58 extending from an outer portion 57. The outer portion 57 may have a slightly curved end surface, such as is shown in FIG. 7.

The lock member 16 has an axial bore 48 dimensioned to receive the securing member 18. In the illustrated embodiment, there is a washer 56 (FIG. 1) positioned between the securing member and the outer portion 57 of the lock member 16.

The lock member 16 is dimensioned to slide over the link member 12 such that a pair of spaced apart tips or tabs 60 of the nose portion 58 are adjacent opposite sides of the connecting portion 26. As shown in FIG. 12, the outer portion 57 of the lock member 16 is dimensioned to fit over the ends 22, 24 of the link member 12, preferably with a close fit with respect to the dimension indicated at A and a clearance fit at its end, as indicated at B.

In some embodiments, the lock member 16 includes mating features that allow the lock member 16 to engage the link member 12 when the lock member 16 and the link member 12 are secured together. In the illustrated embodiment, the lock member 16 has a pair of opposing angled rib surfaces 62 positioned to engage corresponding surfaces of the link member 12, such as the angled surfaces 32, and, if provided, the angled surfaces 34. The lock member 16 may also have straight rib surfaces 64 positioned to engage the guide surfaces 36 and, if provided, the guide surfaces 38. In some embodiments, there are second angled rib surfaces 66 and second straight rib surfaces 68 extending from an opposite side of the lock member 16 and positioned to engage the other of the angled surfaces 32 or 34 and the guide surfaces 36, 38, respectively. In addition to the wedging action provided by engagement of mating surfaces, other approaches in which mechanical advantage is used to urge the ends 22, 24 together can also be used.

The lock member 16 can have curved surfaces 70 in the areas where the nose portion 58 joins the outer portion 57, which help prevent injury to users or damage to equipment from sharp edges.

In operation, a user threads the link member 12 through a terminal link of one portion of chain, and then passes the link member 12 through another portion of chain or another object. Then the locking assembly 14 is coupled to the link member 12. First, the lock member 16 is aligned and guided into engagement with the link member 12 such that the angled surfaces 32, 34 of the link member are in contact with the angled rib surfaces 62, 66 of the lock member 16. The securing member 18 (and washer 56, if provided) is inserted through the aperture 48 of the lock member 16 and into the aperture 40 of the link member 12. In the illustrated embodiment, the nut 54 is attached to the protruding end of the securing member 18. The user then applies a wrench or other suitable tool to the securing member 18 and applies sufficient torque to urge the lock member 16 into a fully coupled position with the link member 12. As a result, the link member has a predetermined initial compression force exerted by the lock member 16 tending to draw the ends 22 and 24 together.

When the chain having the link assembly 10 is fully loaded, the initial compressive force in the link assembly 10 helps counteract the applied load and acts to reduce the chance of failure in the link assembly 10.

In the illustrated embodiments, the fit between the lock member and the link member is a wedging action. As a result, provided certain dimensions are maintained within predetermined tolerances, other dimensions may fluctuate slightly, which eases manufacturing. Because the securing member can be a standard bolt, replacement in the field is easier and less expensive than for coupling links requiring specialized fasteners.

Having illustrated and described the principles of the illustrated embodiments, it will be apparent to those skilled in the art that the embodiments can be modified in arrangement and detail without departing from such principles. In view of the many embodiments, it will be recognized that the illustrated embodiments include only examples and should not be taken as a limitation on the scope of the invention.

The invention claimed is:

1. A coupling link for connecting chain, comprising:
a generally C-shaped link member defining an interior opening and having first and second opposing ends that are spaced apart from each other by a gap;
a lock member shaped for coupling the first and second ends together; and
a securing member operable to secure the lock member to the link member, and to move the lock member to urge the first and second ends of the link member closer together.

2. The coupling link of claim 1, wherein the first and second ends of the link member have respective angled surfaces that slant away from each other in a direction from an outer periphery of the link member towards the interior opening.

3. The coupling link of claim 1, wherein the link member has a first curved portion extending from the first end, a second curved portion extending from the second end, and an intermediate portion extending between the first curved portion and the second curved portion.

4. The coupling link of claim 3, wherein the intermediate portion has a cross-section of greater area than the cross-section of the first end or of the second end.

5. The coupling link of claim 3, wherein the intermediate portion has a cross-section of greater area than the cross-section of the first curved portion or of the second curved portion.

6. The coupling link of claim 3, wherein the intermediate portion has a cross-section of greater area than a corresponding cross section of a conventional regular link member of similar size.

7. The coupling link of claim 1, wherein an outer periphery of the link member is asymmetrically shaped about a longitudinal axis of the link.

8. The coupling link of claim 1, wherein the securing member is a fastener, and the link member has an aperture dimensioned to receive an end of the fastener.

9. The coupling link of claim 8, wherein the aperture is a through hole, further comprising a complimentary fastener engageable with the end of the fastener projecting through the through hole.

10. The coupling link of claim 8, wherein the intermediate portion has a pair of ribs positioned on opposite sides of the aperture.

11. The coupling link of claim 2, wherein the first and second ends have respective guide surfaces spaced from the respective angled surfaces.

12. The coupling link of claim 2, wherein the angled surfaces are first angled surfaces positioned on one side of the link member, further comprising corresponding second angled surfaces positioned generally opposite the first angled surfaces.

13. The coupling link of claim 2, wherein the lock member has angled surfaces positioned to engage the angled surfaces of the ends of the link member.

14. The coupling link of claim 1, wherein when the lock member is fully coupled to the link member, the link member has a predetermined compression loading force exerted by the lock member.

15. The coupling link of claim 1, wherein when the lock member is fully coupled to the link member, the gap between the ends decreases.

16. The coupling link of claim 1, wherein the lock member is generally T-shaped and has a transverse portion configured to extend generally transverse to the link member when the lock member is coupled to the link member.

17. The coupling link of claim 1, wherein the lock member has an aperture dimensioned to receive the securing member.

18. The coupling link of claim 16, wherein the transverse portion of the lock member has a pair of spaced-apart tabs dimensioned to straddle the link member when the lock member and link member are fully coupled together.

19. A coupling link for connecting chain, comprising:

a generally C-shaped link member defining an interior opening and having first and second opposing ends that are spaced apart from each other by a gap;

a lock member shaped for coupling the first and second ends together; and a securing member operable to secure the lock member to the link member, and to move the lock member to urge the first and second ends of the link member closer together, wherein the securing member is a bolt.

20. The coupling link of claim 19, further comprising a nut, wherein the nut is positioned adjacent an outer surface of the link member to engage an end of the bolt.

21. A coupling link for connecting chain, comprising:

a generally C-shaped link member defining an interior opening and having first and second opposing ends that are spaced apart from each other by a gap;

a lock member shaped for coupling the first and second ends together; and a securing member operable to secure the lock member to the link member, and to move the lock member to urge the first and second ends of the link member closer together, wherein the securing member has a portion configured to extend in a direction generally transverse to a longitudinal axis of the link member and across the opening defined by the lock member.

* * * * *